(12) United States Patent
Fukami (10) Patent No.: US 8,425,232 B2
(45) Date of Patent: Apr. 23, 2013

(54) BRAILLE-CHARACTER DISPLAY DEVICE, AND PORTABLE TERMINAL INCLUDING THE SAME

(75) Inventor: Satoshi Fukami, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 1431 days.

(21) Appl. No.: 12/036,028

(22) Filed: Feb. 22, 2008

(65) Prior Publication Data

US 2008/0206722 A1    Aug. 28, 2008

(30) Foreign Application Priority Data

Feb. 27, 2007    (JP) .................................. 2007-48032

(51) Int. Cl.
*G09B 21/00* (2006.01)
(52) U.S. Cl.
USPC .......................................... 434/113; 434/114
(58) Field of Classification Search ........... 434/113–114
See application file for complete search history.

(56) References Cited

U.S. PATENT DOCUMENTS

| | | | | |
|---|---|---|---|---|
| 6,186,396 B1* | 2/2001 | Crandall, Jr. ................... | 235/379 |
| 6,636,202 B2* | 10/2003 | Ishmael et al. ................. | 345/173 |
| 2002/0021278 A1* | 2/2002 | Hinckley et al. ............... | 345/156 |
| 2003/0151597 A1* | 8/2003 | Roberts et al. ................. | 345/173 |
| 2009/0174671 A1 | 7/2009 | Tachi et al. | |

FOREIGN PATENT DOCUMENTS

| | | |
|---|---|---|
| JP | H05-333765 A | 12/1993 |
| JP | 06-217224 | 8/1994 |
| JP | 10-190488 | 7/1998 |
| JP | 2001-069259 | 3/2001 |
| JP | 2003-333144 A | 11/2003 |
| JP | 2004-302437 | 10/2004 |
| JP | 2006-251948 A | 9/2009 |

* cited by examiner

*Primary Examiner* — Xuan Thai
*Assistant Examiner* — Evan Page
(74) *Attorney, Agent, or Firm* — Procopio, Cory, Hargreaves & Savitch LLP (57) ABSTRACT

A Braille-character display device includes a movable pin array, a plurality of movable pin pressing parts, a Braille-character generating part and a movable pin controlling part. The movable pin array has a plurality of movable pins arranged in a matrix form. The plurality of movable pin pressing parts presses the plurality of movable pins, respectively. The Braille-character generating part generates Braille characters. The movable pin controlling part allows the movable pin pressing parts to press the movable pins corresponding to a pattern of the generated Braille characters.

7 Claims, 9 Drawing Sheets

Before pressing

Fig. 4B

After pressing

BRAILLE-CHARACTER DISPLAY DEVICE, AND PORTABLE TERMINAL INCLUDING THE SAME

CROSS-REFERENCE TO RELATED APPLICATION

The present application claims priority under 35 U.S.C. §119 to Japanese Patent Application No. 2007-048032, filed Feb. 27, 2007, entitled "BRAILLE-CHARACTER DISPLAY DEVICE, AND PORTABLE TERMINAL INCLUDING THE SAME." The contents of this application are incorporated herein by reference in their entirety.

BACKGROUND OF THE INVENTION

1. Field of the Invention

The present invention relates to a Braille-character display device capable of pressing a plurality of movable pins to represent Braille characters, and a portable terminal including the same.

2. Description of the Related Art

Recently, there have been commercially available portable terminals such as a mobile telephone, a PHS (Personal Handy-phone System), a PDA (Personal Digital Assistant) and a notebook-sized personal computer. The size and the weight of such portable terminals tends to be reduced. Through a portable terminal, a person with visual impairment can acquire various kinds of information from voice such as conversation and audio guidance.

In the portable terminal, however, acquisition of information from a conversation or audio guidance requires a sense of hearing. Consequently, a person with visual impairment and hearing impairment can not utilize the portable terminal. In addition, there is a bone conduction technique that allows a person to grasp voice via his/her jaw or cranial bone. However, this technique is adopted for acquisition of information from conversation or audio guidance, but can not be utilized for the purpose of reading data of a character string such as electronic mail and information on the Web.

In Braille, an aggregate of physically raised dots (a matrix size: 3×2 or 4×2) represents hiragana characters, and a person touches the aggregate with his/her finger to recognize the characters. For example, a person with visual impairment can acquire various kinds of information through such Braille characters.

Typically, Braille characters are written to a sheet of paper at prescribed spacings, and a user touches raised dots to recognize a word or a sentence. In Braille, however, representation of one hiragana character requires an area of about 25 square millimeters. Consequently, characters equivalent to one novel disadvantageously require a vast amount of paper media. Accordingly, such a paper medium is unsuitable in a case where a user carries a large amount of character data.

In order to avoid this disadvantage, the following technique is known: Braille-character display parts for displaying eight characters are provided radially on a surface of a disc, and Braille characters are updated successively by a mechanism that protrudes, holds or retreats pins corresponding to dots of the Braille characters. According to this technique, Braille characters are successively displayed by rotation of the disc, so that a Braille-character reading mechanism can be applied to a portable device.

SUMMARY OF THE INVENTION

According to an aspect of the present invention, a Braille-character display device includes a movable pin array, a plurality of movable pin pressing parts, a Braille-character generating part and a movable pin controlling part. The movable pin array has a plurality of movable pins arranged in a matrix form. The plurality of movable pin pressing parts presses the plurality of movable pins, respectively. The Braille-character generating part generates Braille characters. The movable pin controlling part allows the movable pin pressing parts to press the movable pins corresponding to a pattern of the generated Braille characters.

According to another aspect of the present invention, a Braille-character display device includes a plurality of movable pins. The plurality of movable pins are adjusted in height at not less than three levels to form one character.

According to further aspect of the present invention, a portable terminal includes the Braille-character display device. The portable terminal has portability.

DESCRIPTION OF THE PREFERRED EMBODIMENTS

With reference to the drawings, hereinafter, a detailed description will be given of preferred embodiments of the present invention. In the specification and the drawings, constituent elements having substantially identical functions and structures are denoted by identical reference numerals; therefore, a repetitive description thereof will not be given.

Portable terminals such as a mobile telephone, a PHS, a PDA and a notebook-sized personal computer are designed so as to be portable by a user. Recently, such portable terminals have been reduced in size and weight. In addition, the portable terminal tends to perform various added functions such as a camera function and an electronic-money function. However, an occupied volume and a usable space for an information grasping part to be newly provided in addition to a displaying part are both restrictive in the portable terminal. A Braille-character display device according to the present invention is applicable to the portable terminal, and allows a user to acquire information with ease by a touch with his/her finger. In the following preferred embodiments, description will be given of a case where the Braille-character display device is applied to a portable terminal, for the sake of facilitation of understanding; however, the present invention is not particularly limited to this case. For example, the Braille-character display device can be applied to various electronic appliances. First, a brief description will be given of a hardware structure of the portable terminal as the Braille-character display device, and then a description will be given of functions and operations thereof.

First Embodiment

Figure 1:
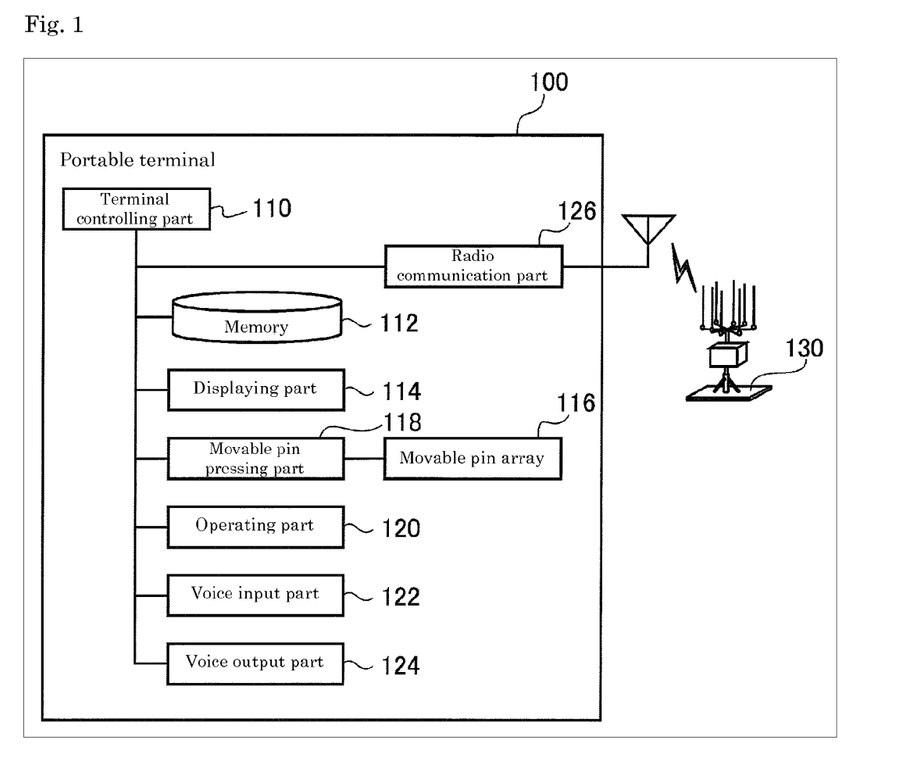
FIG. 1 is a block diagram showing a hardware structure of a portable terminal according to a first embodiment of the present invention.
Figure 2:
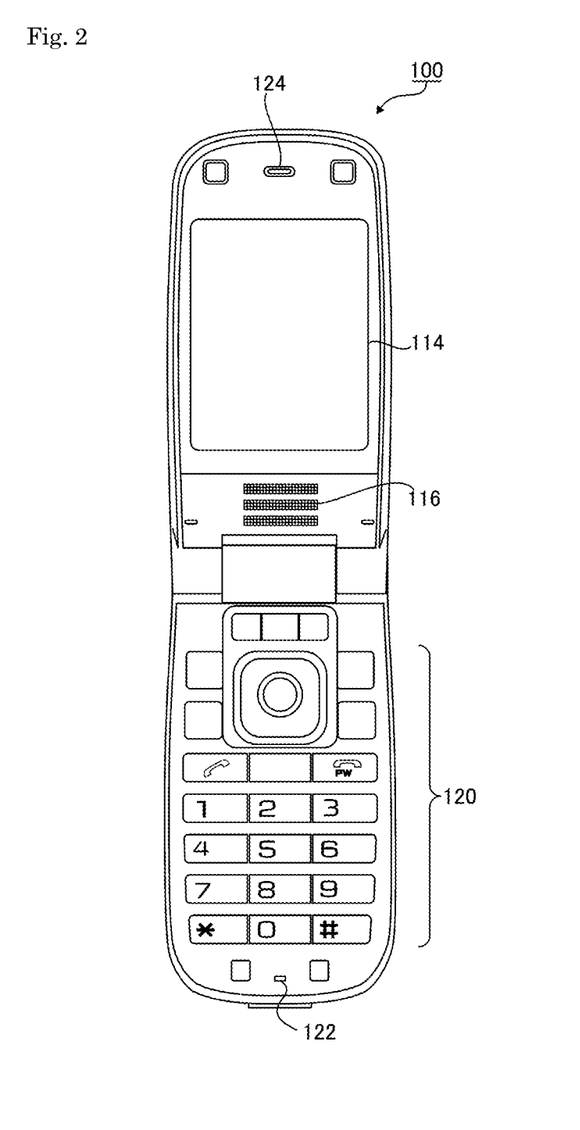
FIG. 2 is an external view showing constituent elements provided on a front face of the portable terminal.

As shown in FIGS. 1 and 2, a portable terminal 100 is activated by reception of electric power from a built-in battery (e.g., a primary battery, a secondary battery, a solar cell, a fuel cell). The portable terminal 100 includes, as its constituent elements, a terminal controlling part 110, a memory 112, a displaying part 114, a movable pin array 116, a movable pin pressing part 118, an operating part 120, a voice input part 122, a voice output part 124 and a radio communication part 126.

The terminal controlling part 110 manages and controls the entire portable terminal 100 through a semiconductor integrated circuit including a central processing unit (CPU). The terminal controlling part 110 performs a conversation function and an e-mail delivery function with the use of programs stored in the memory 112.

The memory 112 is, for example, a ROM, a RAM, an EEPROM, a nonvolatile RAM, a flash memory or an HDD, and stores the programs to be executed by the terminal controlling part 110.

The displaying part 114 is, for example, a color display or a monochrome display. The displaying part 114 can display a GUI (Graphical User Interface) such as an Web browser or an application which is stored in the memory 112 or is supplied, through the radio communication part 126 (to be described later), from an application server (not shown) connected to a communication network.

The movable pin array 116 has a plurality of movable pins arranged in a matrix form with ends of the plurality of movable pins being aligned in a substantially planar shape. With reference to FIG. 2, the movable pin array 116 is provided on a front face of the portable terminal 100 at a position adjacent to the displaying part 114; however, the present invention is not particularly limited to this case. For example, the movable pin array 116 may be provided on a back face or a side face of the portable terminal 100. In order to make the movable pin array 116 waterproof and dustproof, the movable pin array 116 may be entirely coated with a resin-based film. Further, the movable pin array 116 may be provided with an openable/closable cover. In a case where a user does not utilize a Braille-character display function or does not need the Braille-character display function, the movable pin array 116 can be concealed by the cover.

Figure 3:
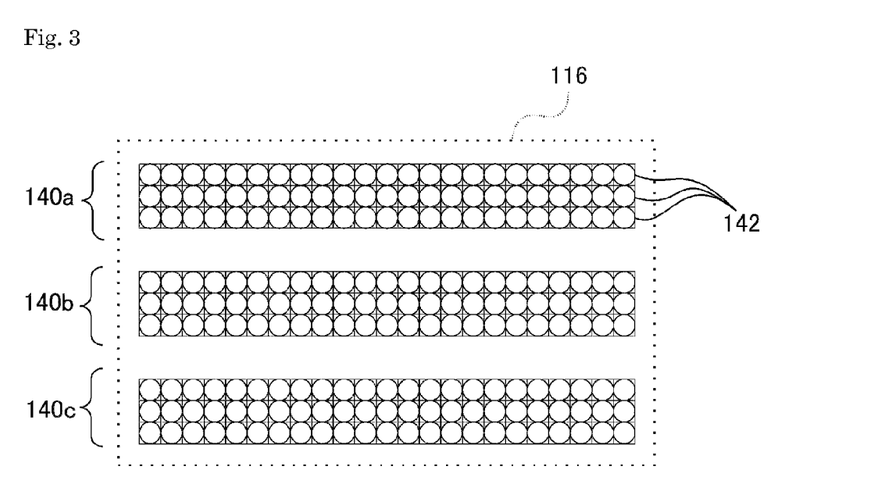
FIG. 3 is an enlarged external view showing a movable pin array.

With reference to FIG. 3, the movable pin array 116 includes three arrangement tiers 140a, 140b and 140c. Each of the arrangement tiers 140a, 140b and 140c has the plurality of movable pins 142 arranged in a matrix form (a matrix size: 3×23). Each of the arrangement tiers 140a, 140b and 140c represents dots corresponding to a row of Braille characters (a matrix size: 3×2). As described above, only a portion (the arrangement tiers 140a, 140b, 140c) to be used for display of the Braille characters is constituted of the movable pins 142, resulting in cost reduction.

In the movable pin array 116, moreover, the number of movable pins to be arranged in a longitudinal direction may be made greater so that the area where a user touches with his/her finger is larger.

The movable pin pressing part 118 is provided for each movable pin 142 in the movable pin array 116. That is, the plurality of movable pin pressing parts 118 press the plurality of movable pins 142, respectively, in one-to-one correspondence.

Figure 4A:
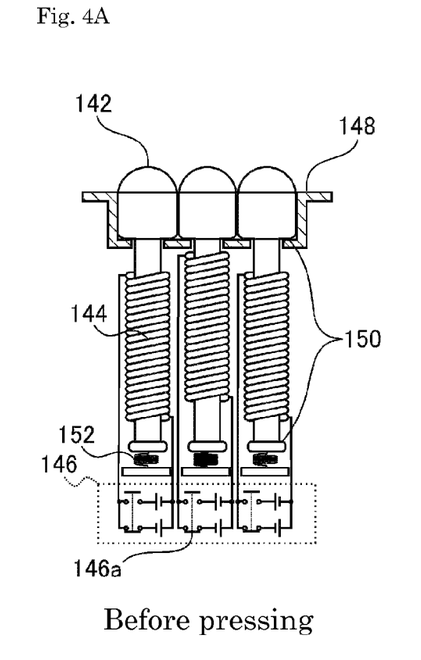
FIG. 4A illustrates a state before a movable pin pressing part presses a movable pin.
Figure 4B:
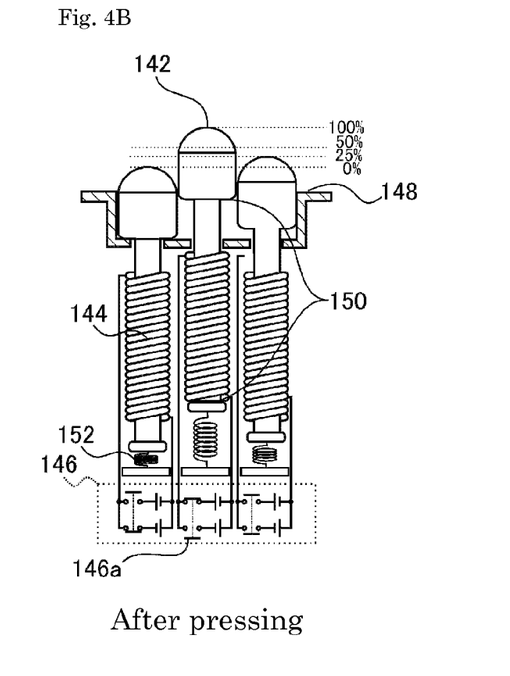
FIG. 4B illustrates a state after the movable pin pressing part has pressed the movable pin.

FIG. 4A and FIG. 4B each illustrate a state where the movable pin pressing part 118 presses the movable pin 142. In FIG. 4A and FIG. 4B, the structure of the movable pin pressing part 118 is shown in a cross-sectional manner. With reference to FIG. 4A and FIG. 4B, the movable pin 142 is made of a magnetic material, and is magnetized previously. The movable pin pressing part 118 includes a coil 144 and a power supply 146. The power supply 146 has a switch 146a that allows the polarity of an applied voltage to be inverted. Thus, the movable pin pressing part 118 presses or retreats the movable pin 142. In addition, each movable pin 142 is provided with a spring 152 as one example of an elastic member. In a case where no voltage is applied from the power supply 146, an elastic force of the spring 152 maintains a position of each movable pin 142 at a neutral point (50% of a pressing upper limit). This neutral point also corresponds to an initial position of the portable terminal 100 before power-on.

In the state shown in FIG. 4A (before pressing), for example, a downward electromagnetic force is applied to each movable pin 142, so that all the movable pins 142 are stationary while being almost flush with a surface 148. In the state shown in FIG. 4B (after pressing), moreover, an upward electromagnetic force is applied to the central movable pin 142, so that only the central movable pin 142 is pressed so as to protrude from the surface 148. Herein, no electromagnetic force is applied to the right movable pin 142 in FIG. 4B, so that the elastic force maintains the right movable pin 142 at the neutral point. In any of the states shown in FIG. 4A and FIG. 4B, the electromagnetic force is continuously applied to one end of the movable pin 142 in the longitudinal direction in some cases. However, the movable pin 142 is guided to an inner circumference of the coil 144, and the movement thereof is physically restricted by stoppers 150. Therefore, the movable pin 142 is stationary at any one of an upper position, a middle position and a lower position.

The foregoing configuration that the movable pin pressing part 118 presses the movable pin 142 through the electromagnetic force allows formation of a mechanism for pressing the movable pin 142 with ease at low cost. In addition, a mechanism for transmitting mechanical power is not provided separately, so that an occupied volume of the Braille-character display device can be reduced.

Moreover, the three movable pins 142 described above may be formed such that the respective upper positions are made different from one another. In FIG. 4A and FIG. 4B, for example, it is assumed that the upper position of the central movable pin 142 is 100% height. Then, the left and right movable pins 142 are formed such that the respective upper positions are 50% relative to the upper position of the central movable pin 142. Accordingly, the middle position of the central movable pin 142 becomes equal in height to the upper positions of the left and right movable pins 142. Further, the middle positions of the left and right movable pins 142 are one-fourth (25%) relative to the upper position of the central movable pin 142 in height.

This configuration realizes four-level heights as a whole although each movable pin 142 moves vertically at three levels (the upper position, the middle position, the lower position). Thus, this configuration can provide a hemispherical shape as a feature of this embodiment. A shape of Braille characters represented by the movable pins having different upper positions will be described later with reference to FIG. 8.

In the foregoing description, moreover, the movable pin 142 is controlled by the electromagnetic force. Alternatively, the movable pin 142 may be controlled linearly by a piezo-electrically-driven plunger or an electromagnetically-driven plunger.

The operating part 120 is, for example, a switch such as a keyboard, a cross key or a joystick, and accepts an input from a user.

The voice input part 122 converts, to a voice signal, voice of a user input through a microphone or the like during conversation.

The voice output part 124 converts, to voice, a voice signal transmitted from a counterpart, and then outputs the voice through a loudspeaker or the like. In addition, the voice output part 124 can output a ringing melody, a sound generated when a user manipulates the operating part 120, an alarm sound and the like.

The radio communication part 126 establishes radio communication with a base station 130 on a mobile telephone network. Examples of the radio communication include time division multiplexing and the like. According to the time division multiplexing, communication is established in such a manner that a plurality of time slots obtained by dividing a frame on a time basis in the base station 130 are allocated to channels of the portable terminal 100, respectively.

In order to connect a line from the portable terminal 100 to another portable terminal 100, a user manipulates the portable terminal 100 so as to establish radio communication with a base station 130 in a coverage area. Thus, the user starts to hold conversation with a user of the target portable terminal 100 through the communication network and a base station 130 in a coverage area of the target portable terminal 100.

A user with visual impairment touches, with his/her finger, the movable pin array 116 on the portable terminal 100 to acquire information from Braille characters displayed on the movable pin array 116.

Figure 5:
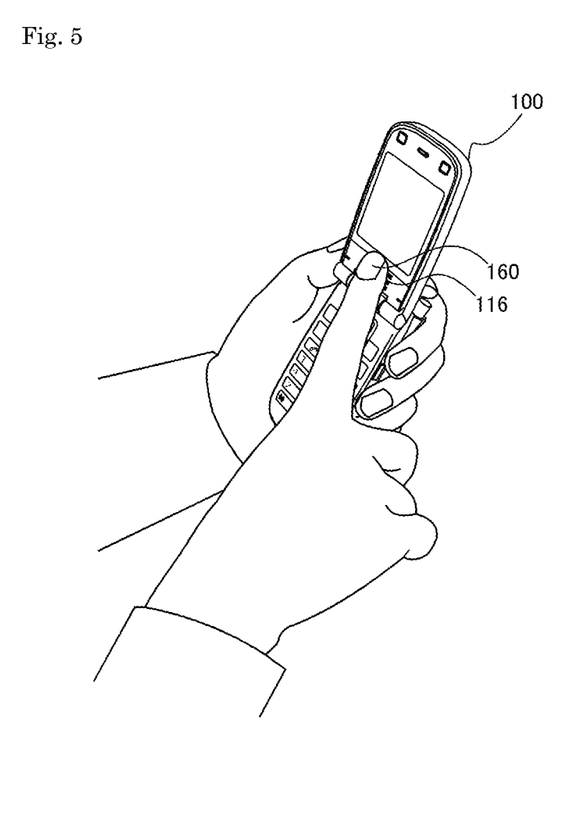
FIG. 5 is an external view showing a case where a user utilizes a Braille-character display function of the portable terminal.

As will be apparent from FIG. 5, a user touches the movable pin array 116 of the portable terminal 100 with his/her finger 160, thereby reading Braille characters represented by the movable pin array 116 with ease. Hereinafter, a detailed description will be given of a function of displaying Braille characters on the movable pin array 116.

Figure 6:
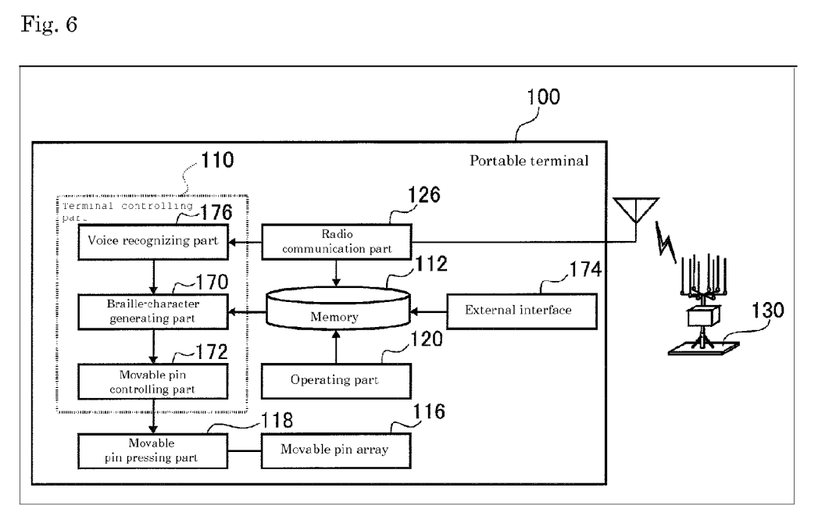
FIG. 6 is a functional block diagram showing schematic functions concerning display of Braille characters on the portable terminal.

With reference to FIG. 6, the terminal controlling part 110 includes a Braille-character generating part 170, a movable pin controlling part 172 and a voice recognizing part 176. The Braille-character generating part 170, the movable pin controlling part 172 and the voice recognizing part 176 implement the following processes, respectively.

The Braille-character generating part 170 generates a pattern of Braille characters corresponding to Japanese kana characters, with the use of a table stored in the memory 112. For example, the Braille-character generating part 170 generates the pattern of the Braille characters from data of a character string stored in the memory 112.

Examples of the data of the character string may include data of a character string obtained by download from the base station 130 through the radio communication part 126, data of a character string obtained by reading from an external storage medium through an external interface 174, data of a character string created by a user through the operating part 120, and the like. This configuration allows conversion of the data of the character string stored in the memory 112 to the pattern of the Braille characters. The user can retrieve the data of the character string by the sense of touch.

Moreover, the Braille-character generating part 170 can generate a pattern of Braille characters from voice recognized by the voice recognizing part 176. This voice recognizing part 176 receives voice data through the radio communication part 126, recognizes voice of the voice data, and converts a sound of the voice to hiragana characters. As in the case of the data of the character string described above, thus, the voice can be converted to a pattern of Braille characters. A user can grasp the voice by the sense of touch.

The movable pin controlling part 172 allows the movable pin pressing parts 118 to press the movable pins 142 corresponding to the pattern of the Braille characters generated by the Braille-character generating part 170.

Next, description will be given of specific operations for display of Braille characters in the portable terminal 100. In the portable terminal 100 according to this embodiment, first, the Braille-character generating part 170 generates a pattern of Braille characters. Then, the movable pin controlling part 172 issues a command to the movable pin pressing parts 118 so as to allow the movable pin pressing parts 118 to press the movable pins 142 corresponding to the pattern of the Braille characters generated by the Braille-character generating part 170. The movable pin pressing parts 118 are equal in number to the movable pins 142. The command described above specifies a degree of pressing the movable pin 142. Thus, pits and depressions that represent the Braille characters are formed on the movable pin array 116 by the movable pin pressing parts 118.

As described above, the respective movable pins 142 are pressed on the movable pin array 116, so that the Braille characters can be formed on a limited space on the portable terminal 100. Thus, a person with visual impairment and hearing impairment can acquire information with ease only by a touch of the movable pin array 116 with his/her finger.

Herein, the movable pin controlling part 172 adjusts pressing amounts of the respective movable pins 142 successively, thereby shifting the pattern of the Braille characters formed by the movable pins 142 in a certain direction. In this case, each movable pin 142 has a section smaller than a bottom surface of each dot of the Braille characters. The plurality of movable pins 142 forms the respective dots of the Braille characters. A top contour formed by the plurality of movable pins 142 is a substantially hemispherical shape. As the section of the movable pin 142 is smaller, that is, as a density of the movable pins 142 is higher, such a substantially hemispherical shape can be reproduced with higher accuracy. In order to represent more smooth Braille characters in shape, accordingly, the density of the movable pins 142 may be increased such that the section of each movable pin 142 is reduced as much as possible if such a reduction can be performed mechanically without an increase of cost.

As described above, in the case where the movable pin controlling part 172 shifts the pattern of the Braille characters formed by the movable pins 142 in the certain direction, the heights of the movable pins 142 are adjusted in accordance with the hemispherical shape of the Braille characters. Thus, it is possible to obtain such a motion that the rounded Braille characters flow smoothly in the certain direction.

Figure 7:
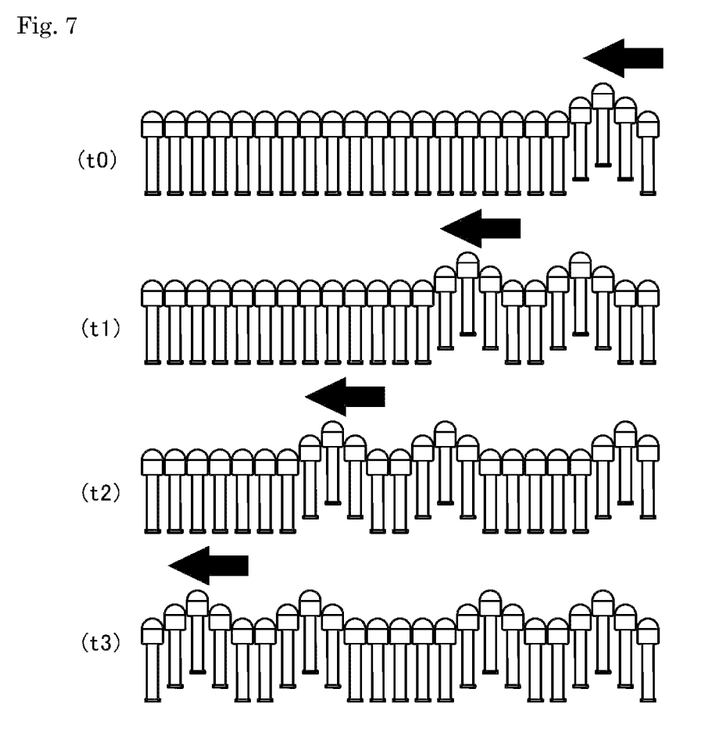
FIG. 7 illustrates the movable pins pressed by the movable pin pressing parts under control by a movable pin controlling part.

FIG. 7 shows a longitudinal section of an arrangement of the movable pins 142 on the movable pin array 116. Herein, the movable pins 142 (a matrix size: 3×3) represent the dots of the Braille characters, respectively. In other words, three movable pins 142 represent one dot of Braille characters in FIG. 7.

In FIG. 7, further, the pressed movable pins 142 are shifted from right to left as shown by arrow marks with the passage of time (t0→t1→t2→t3). Thus, the movable pins 142 shift as if the movable pins 142 slide on the movable pin array 116. As a result, it is possible to obtain such a motion as if the Braille characters flow in a certain direction. Accordingly, a user can read the Braille characters without moving his/her finger as in the case where the user reads fixed Braille characters by sliding his/her finger on the Braille characters. That is, the user can acquire information with ease, without an effort to move his/her finger.

Moreover, this operation that requires no effort to move a finger allows a user, who can not move his/her finger or hand with ease, to acquire information with certainty.

Figure 8:
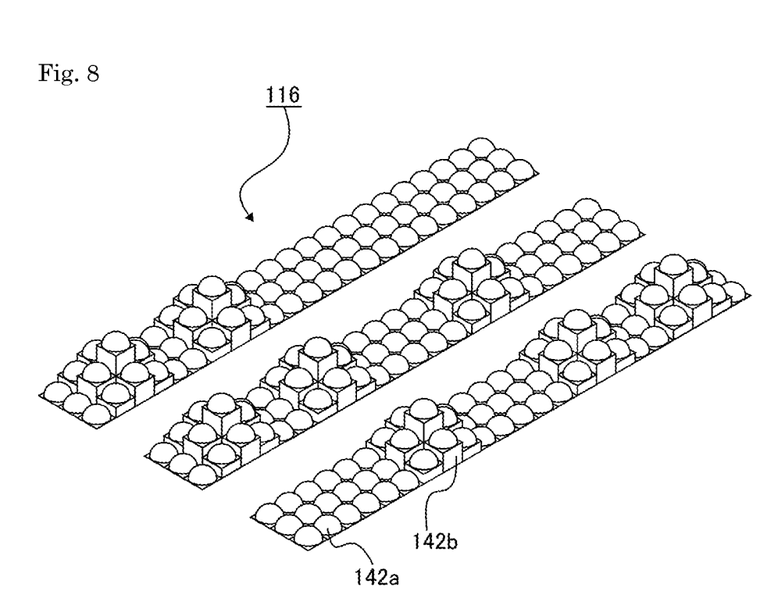
FIG. 8 shows display of Braille characters.

FIG. 8 illustrates one example of display of the Braille characters generated as described above. The movable pin array 116 shown in FIG. 8 includes a combination of movable pins 142a which are not pressed and movable pins 142b which are pressed. The heights of the respective movable pins are adjusted to represent Braille characters (a matrix size: 3×2) as a whole. As described above with reference to FIG. 4, herein, the heights of the respective movable pins 142 pressed by 100% are different from one another depending on an arranged position. The combination of the movable pins 142 different in height from one another forms a hemispherical shape of Braille characters.

Second Embodiment

In the first embodiment, the pattern of the Braille characters formed by the movable pins 142 is shifted from right to left; however, the shift of the movable pins 142 (the shift of the Braille characters) is not limited to this case. That is, the pattern of the Braille characters may be shifted in any one of an up direction, a down direction, a left direction and a right direction each corresponding to the arrangement direction of the movable pins 142. As described above, the pattern of the Braille characters is shifted freely in the up direction, the down direction, the left direction or the right direction. As a result, a user can ordinarily read the Braille characters from left to right and, also, repeatedly read or skip over the Braille characters. That is, the shift described above can respond to various movements desired by the user. In a second embodiment, hereinafter, description will be given of a configuration that a shift direction of Braille characters is adjusted to read the Braille characters at a desired position.

Figure 9:
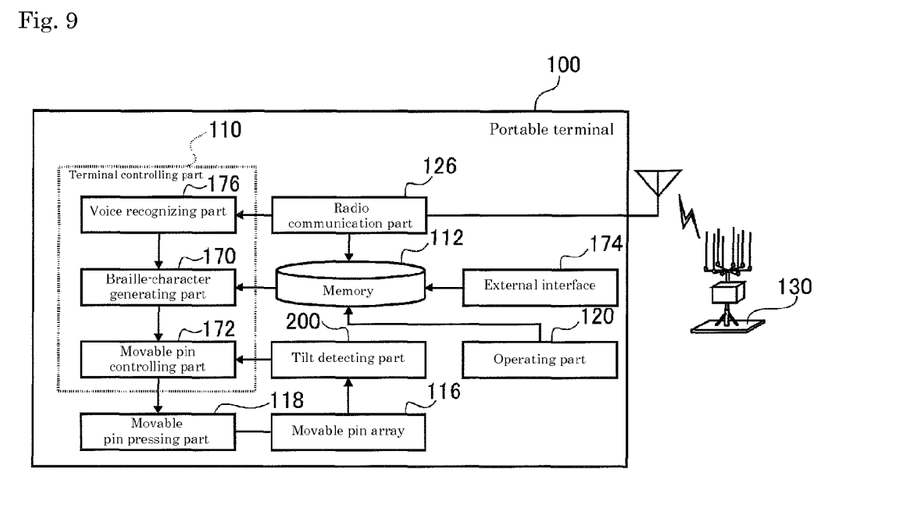
FIG. 9 is a functional block diagram showing schematic functions concerning display of Braille characters on the portable terminal according to a second embodiment of the present invention.

The second embodiment shown in FIG. 9 is different from the first embodiment shown in FIG. 6. That is, the portable terminal 100 according to the second embodiment adds a plurality of tilt detecting parts 200. The tilt detecting parts 200 are provided in correspondence with the movable pins 142 to detect a tilt direction and a tilt angle of the movable pins 142. Then, the movable pin controlling part 172 shifts a pattern of Braille characters formed by the movable pins 142, in a direction opposite to the tilt direction detected by the tilt detecting parts 200, at a shift speed corresponding to the tilt angle. Alternatively, a single tilt detecting part 200 may be provided in correspondence with the movable pin array 116 to detect a tilt direction and a tilt angle of the entire movable pin array 116.

According to this configuration, a user can shift Braille characters in a desired direction through tilt of the movable pins 142 without using an additional switch, that is, only with his/her finger for grasp of the Braille characters. In addition, the shift speed of the Braille characters can be adjusted through the tilt angle of the movable pins 142. Therefore, the user can read the Braille characters at a suitable speed in accordance with his/her ability to grasp Braille characters.

Third Embodiment

Another Adjustment of Shift Direction of Braille Characters

Figure 10:
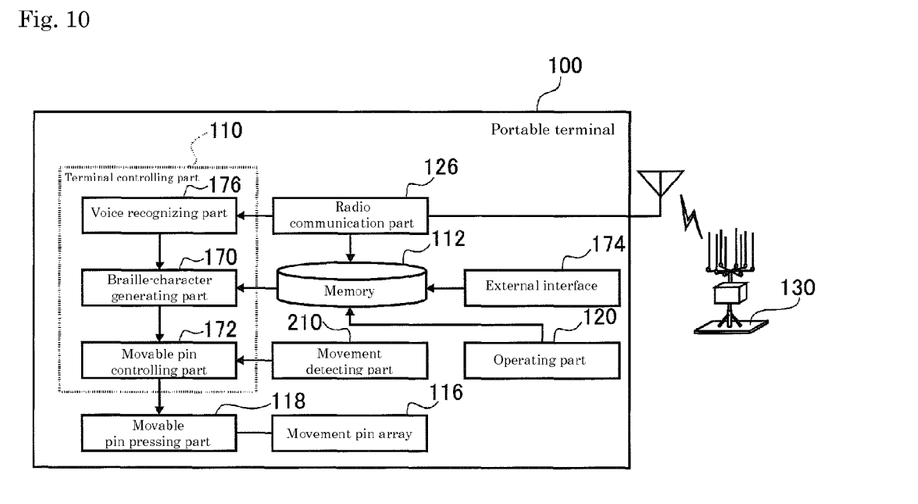
FIG. 10 is a functional block diagram showing schematic functions concerning display of Braille characters on the portable terminal according to a third embodiment of the present invention.

According to a third embodiment of the present invention shown in FIG. 10, the portable terminal 100 newly includes a movement detecting part 210 in place of the tilt detecting parts 200. The movement detecting part 210 includes an accelerometer and a speedometer, and integrates measured values to detect a movement direction and a movement amount of the portable terminal 100 itself. Then, the movable pin controlling part 172 shifts a pattern of Braille characters formed by the movable pins 142, in a direction opposite to the movement direction detected by the movement detecting part 210, by the movement amount.

Figure 11:
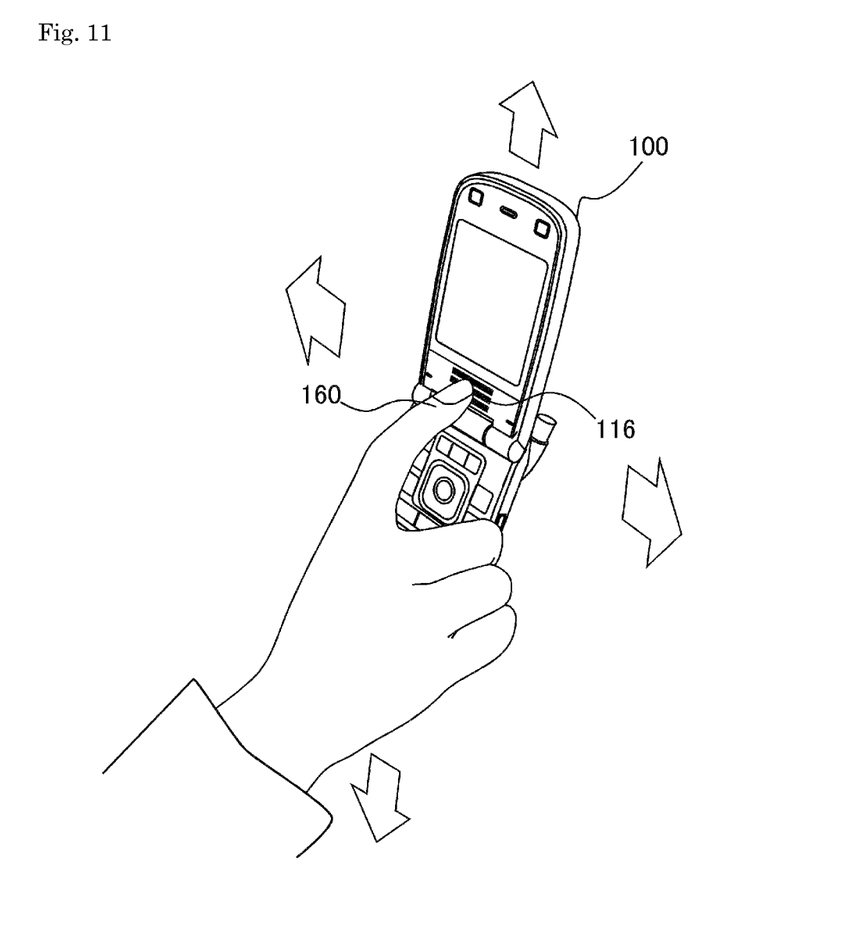
FIG. 11 shows a conception of a shift of Braille characters by a movement detecting part.

In FIG. 11, a user holds the portable terminal 100 by one hand in a state where his/her finger 160 is placed on the movable pin array 116. In this state, when the user moves his/her hand in an up, down, left or right direction while holding the portable terminal 100, Braille characters formed on the movable pin array 116 moves in a direction opposite to the detected direction. Therefore, an absolute position of the Braille-characters on a plane never changes, so that the user can read the Braille-character as if he/she touches Braille characters on a sheet of paper.

According to this configuration, the user moves the portable terminal 100 in a desired Braille-character reading direction while putting his/her finger on the movable pin array 116, thereby shifting the Braille characters in accordance with a movement direction and a movement amount of the portable terminal 100 without using an additional switch. Thus, the user can read the Braille characters in a desired direction.

Herein, the movable pin array 116 includes the three arrangement tiers 140a, 140b and 140c. Alternatively, the movable pins 142 may be arranged at an entire area occupied by the movable pin array 116. This arrangement of the movable pins 142 in the entire area makes it possible to shift Braille characters in a state where the Braille-characters are tilted, so that adjustment for a shift direction of the Braille characters can be performed smoothly.

According to the first to third embodiments, the portable terminal 100 allows a person with visual impairment and hearing impairment to acquire information with ease only by the sense of touch with his/her finger.

More specifically, the movable pins on the movable pin array are pressed to form Braille characters on the small area on the Braille-character display device. The user touches the movable pin array with his/her finger, thereby acquiring information with ease.

The movable pin controlling part may shift a pattern of Braille characters formed by the movable pins in the certain direction. With this configuration, the movable pins shift as if the movable pins slide on the movable pin array. As a result, it is possible to obtain such a motion as if the Braille characters flow in a certain direction. Accordingly, a user can read the Braille characters without moving his/her finger as in the case where the user reads fixed Braille characters by sliding his/her finger on the Braille characters. That is, the user can acquire information with ease, without an effort to move his/her finger.

Moreover, this operation that requires no effort to move a finger allows a user, who can not move his/her finger or hand with ease, to acquire information with certainty.

The certain direction may be one of the up direction, the down direction, the left direction and the right direction each corresponding to the arrangement direction of the movable pin.

With this configuration, Braille characters are shifted freely in the up direction, the down direction, the left direction or the right direction. As a result, a user can ordinarily read the Braille characters from left to right and, also, repeatedly read or skip over the Braille characters. That is, the shift described above can respond to various movements desired by the user.

The Braille-character display device may include the plurality of tilt detecting parts detecting the tilt direction and the tilt angle of the movable pins. Herein, the movable pin controlling part may shift the pattern of the Braille characters formed by the movable pins, in the direction opposite to the tilt direction detected by the tilt detecting parts, at the shift speed corresponding to the tilt angle.

With this configuration, a user can shift the Braille characters in a desired direction through the tilt direction of the movable pins without using an additional switch, that is, only with his/her finger for grasp of the Braille characters. In addition, the shift speed of the Braille characters can be adjusted through the tilt angle of the movable pins. Therefore, the user can read the Braille characters at a suitable speed in accordance with his/her ability to grasp Braille characters.

The Braille-character display device may include the movement detecting part detecting the movement direction and the movement amount of the Braille-character display device itself. Herein, the movable pin controlling part may shift the pattern of the Braille characters formed by the movable pins, in the direction opposite to the movement direction detected by the movement detecting part, by the movement amount.

With this configuration, a user moves the Braille-character display device in a desired Braille-character reading direction while putting his/her finger on the movable pin array, thereby shifting the Braille characters in accordance with the movement direction and the movement amount of the Braille-character display device without using an additional switch. Thus, the user can read the Braille-characters as if he/she touches Braille characters on a sheet of paper, and can read the Braille characters in a desired direction.

The movable pin may have the section smaller than the bottom surface of each dot of the Braille characters. Further, the plurality of movable pins may form the respective dots of the Braille characters. In addition, the contour formed by the plurality of movable pins may be the substantially hemispherical shape.

With this configuration, dots corresponding to one character can be represented by at least two movable pins. Moreover, the substantially hemispherical shape, which is a standard shape of Braille characters, can be formed by adjustment of the heights of the plurality of movable pins. In the case where the movable pin controlling part shifts the pattern of the Braille characters formed by the pressed movable pins in the certain direction, the heights of the movable pins are adjusted in accordance with the hemispherical shape of the Braille characters. Thus, it is possible to obtain such a motion that the rounded Braille characters flows smoothly in a certain direction.

The Braille-character generating part may generate a pattern of Braille characters from data of a character string in the Braille-character display device.

In a case where the portable terminal includes a radio communication part capable of establishing radio communication with a base station, data of a character string downloaded by the radio communication can be stored in the memory of the portable terminal. In a case where the portable terminal includes an external interface, data of a character string read from an external storage medium can be stored in the memory of the portable terminal. In a case where the portable terminal includes an operating part, data of a character string created by a user can be stored in the memory of the portable terminal. Then, the Braille-character generating part can convert such stored data of the character string to a pattern of Braille characters. Thus, the user can retrieve the data of the character string by the sense of touch.

The Braille-character display device may include the voice recognizing part recognizing voice of audio data in the Braille-character display device. Herein, the Braille-character generating part may generate a pattern of Braille characters from the recognized voice.

With this configuration, the voice can be converted to the pattern of the Braille characters as in the foregoing case of the data of the character string. Thus, a user can grasp the voice by the sense of touch.

The movable pin pressing part may press the movable pin by an electromagnetic force. With this configuration, a mechanism for pressing the movable pin can be manufactured with ease at low cost. In addition, the Braille-character display device requires no mechanism for transmitting mechanical power, resulting in reduction of an occupied area.

The present invention is applicable to a portable terminal capable of successively pressing a plurality of movable pins to represent Braille characters.

It is needless to say that the present invention is not limited to the foregoing embodiments. It is therefore understood that numerous modifications and variations can be devised by those skilled in the art without departing from the scope of the appended claims. Accordingly, such modifications and variations are, unless they depart from the scope of the present invention as delivered from the claims appended hereto, to be construed as included therein.

In the second and third embodiments, for example, a shift direction of Braille characters is adjusted without use of a separate switch. However, the present invention is not limited to this example. For example, the respective switches on the portable terminal 100 may be used as follows. That is, Braille characters corresponding to two hiragana characters are displayed on the movable pin array 116, and then Braille characters corresponding to subsequent two hiragana characters are displayed in such a manner that a user presses an optional switch of the operating part 120.

The invention claimed is:

1. A Braille-character display device, comprising:
   a movable pin array having a plurality of movable pins arranged in a matrix form;
   a plurality of movable pin pressing parts pressing the plurality of movable pins, respectively;
   a Braille-character generating part generating Braille characters; and
   a movable pin controlling part programmed to cause the movable pin pressing parts to press the movable pins corresponding to a pattern of the generated Braille characters and shift the pattern of Braille characters formed by the movable pins in a lateral direction to cause a flow of the Braille characters in the lateral direction,
   wherein the movable pin array comprises three movable pin sub-arrays having three-pin arrays.

2. A Braille-character display device, comprising:
a plurality of movable pins;
a movable pin controlling part programmed to move the movable pins to create a pattern of Braille characters and shift the pattern of the Braille characters formed by the movable pins in a lateral direction to cause a flow of the Braille characters in the lateral direction, wherein
the plurality of movable pins are adjusted in height at not less than three levels to form one character, the movable pins moving successively in a vertical direction to form a sentence, and
a plurality of movable pins form one dot of a Braille-character.

3. The Braille-character display device according to claim 2, wherein
the plurality of movable pins forming one dot of a Braille-character include a three by three array of movable pins forming one dot of a Braille-character.

4. A Braille-character display device, comprising:
a movable pin array having a plurality of movable pins arranged in a matrix form;
a plurality of movable pin pressing parts pressing the plurality of movable pins, respectively;
a Braille-character generating part generating Braille characters; and
a movable pin controlling part programmed to cause the movable pin pressing parts to press the movable pins corresponding to a pattern of the generated Braille characters and shift the pattern of Braille characters formed by the movable pins in a lateral direction to cause a flow of the Braille characters in the lateral direction,
wherein the movable pin array includes three spaced rows of pin arrays generating three respective spaced rows of dots, the three spaced rows of dots collectively forming Braille-characters.

5. The Braille-character display device according to claim 4, wherein
the spaced rows of dots include pressed movable pins of raised heights forming the dots and not pressed lowered movable pins forming recessed spaces between dots.

6. A Braille-character display device, comprising:
a Braille-character generating part generating Braille characters; and
a movable pin controlling part programmed to cause the movable pin pressing parts to press the movable pins corresponding to a pattern of the generated Braille characters and shift the pattern of Braille characters formed by the movable pins in a lateral direction to cause a flow of the Braille characters in the lateral direction,
wherein a three by three array of movable pins form one dot of a Braille-character, the three by three array of movable pins including a central pin at a highest height, a set of corner pins at a lowest height, and a set of pins between the corner pins at an intermediate height between the highest height and the lowest height.

7. A Braille-character display device comprising:
a movable pin array having a plurality of movable pins;
a plurality of movable pin pressing parts pressing the plurality of movable pins; and
a movable pin controlling part programmed to cause the movable pin pressing parts to press the movable pins corresponding to a pattern of Braille characters,
wherein the movable pin array part comprises three movable pin sub-arrays.

\* \* \* \* \*